(12) United States Patent
Hung

(10) Patent No.: US 8,190,814 B2
(45) Date of Patent: May 29, 2012

(54) MEMORY ACCESS APPARATUS AND DISPLAY USING THE SAME

(75) Inventor: Chung-Wen Hung, Taichung (TW)

(73) Assignee: Novatek Microelectronics Corp., Hsinchu (TW)

( * ) Notice: Subject to any disclaimer, the term of this patent is extended or adjusted under 35 U.S.C. 154(b) by 538 days.

(21) Appl. No.: 12/369,755

(22) Filed: Feb. 12, 2009

(65) Prior Publication Data

US 2009/0259809 A1 Oct. 15, 2009

(30) Foreign Application Priority Data

Apr. 15, 2008 (TW) .............................. 97113616 A

(51) Int. Cl.
*G06F 12/00* (2006.01)
(52) U.S. Cl. ......... 711/105; 711/170; 711/171; 711/172
(58) Field of Classification Search .................. 711/105, 711/170
See application file for complete search history.

(56) References Cited

U.S. PATENT DOCUMENTS

| | | | |
|---|---|---|---|
| 5,689,825 A * | 11/1997 | Averbuch et al. | 455/418 |
| 6,433,786 B1 * | 8/2002 | Jones, Jr. | 345/544 |
| 7,400,327 B1 * | 7/2008 | Van Dyke et al. | 345/531 |
| 2006/0063490 A1 * | 3/2006 | Bader et al. | 455/45 |
| 2006/0106969 A1 * | 5/2006 | Hoogerbrugge | 711/1 |
| 2008/0126547 A1 * | 5/2008 | Waldspurger | 709/226 |
| 2008/0159045 A1 * | 7/2008 | Jang | 365/226 |
| 2009/0028182 A1 * | 1/2009 | Brooks et al. | 370/466 |

* cited by examiner

*Primary Examiner* — Hashem Farrokh
(74) *Attorney, Agent, or Firm* — Jianq Chyun IP Office

(57) ABSTRACT

A memory access apparatus and a display using the same are provided. The memory access apparatus includes a dynamic memory, a plurality of clients and a memory management unit. The dynamic memory is used to store a plurality of memory data. The clients access the dynamic memory and each client has a priority. The memory management unit executes an access action of the clients for the dynamic memory respectively according to the priorities thereof. Besides, the memory management unit has at least one buffer area built therein. The buffer area is used to temporarily store a plurality of buffer data generated while the access action is performed.

14 Claims, 5 Drawing Sheets

MEMORY ACCESS APPARATUS AND DISPLAY USING THE SAME

CROSS-REFERENCE TO RELATED APPLICATION

This application claims the priority benefit of Taiwan application serial no. 97113616, filed on Apr. 15, 2008. The entirety of the above-mentioned patent application is hereby incorporated by reference herein and made a part of specification.

BACKGROUND OF THE INVENTION

1. Field of the Invention

The present invention generally relates to a memory access apparatus, in particular, to a memory access apparatus and a display using the same.

2. Description of Related Art

Current electronic systems all need memories to store data, and thus dynamic memories with a large capacity, such as dynamic random access memory (DRAM), are frequently used. However, such dynamic memories have a complicated accessing action, and generally, more than one electronic device (referred to as client hereinafter) in the same electronic system requires accessing the dynamic memory. Therefore, when a plurality of clients needs to access the dynamic memory simultaneously, a buffer must be disposed corresponding to each client for assisting the access action.

FIG. 1 is a schematic view of a conventional memory access apparatus 100. Referring to FIG. 1, clients 130, 140 in the memory access apparatus 100 intend to perform a writing action for a dynamic memory 110. Since two writing actions cannot be performed on the same dynamic memory 110 at the same time, the clients 130, 140 respectively write the data in corresponding buffers 131, 141. A memory management unit 120 detects whether the dynamic memory 110 is idle or not. Once the dynamic memory 110 is found to be idle, the data temporarily stored in the buffers 131, 141 is sequentially written in the dynamic memory 110.

In addition, clients 150-180 intend to read data from the dynamic memory 110. Similarly, the dynamic memory 110 does not support reading data by so many clients simultaneously, and thus, the memory management unit 120 prefetches the data to be read by the clients 150-180 when the dynamic memory 110 is idle, and stores the data in buffers 151-181. Once the clients 150-180 need to read the data, they simply read the data in the corresponding buffers 151-181.

As can be known from the above that, the memory access apparatus 100 should dispose buffers corresponding to the number of clients, and as a result, the conventional memory access apparatus 100 is always disposed with a large amount of buffers. Moreover, the resources of the buffers cannot be shared among each other, such that the buffers have a low efficiency, thereby severely increasing the manufacturing cost.

SUMMARY OF THE INVENTION

Accordingly, the present invention is directed to a memory access apparatus, which enables a plurality of clients to effectively access a dynamic memory, and to increase an available bandwidth thereof.

The present invention is also directed to a memory access apparatus used for a display, which enables a plurality of clients in the display to access a dynamic memory at a maximum bandwidth.

The present invention provides a memory access apparatus, which includes a dynamic memory and a memory management unit. The dynamic memory is used to store a plurality of memory data, and the memory management unit is coupled to the dynamic memory. The memory management unit has a plurality of connection ports and each connection port is connected to a corresponding client. The memory management unit stores a priority as a sequence for the clients to access the dynamic memory. When the client accesses the dynamic memory, at least one buffer area is built in the memory management unit, so as to temporarily store a plurality of buffer data generated while the access action is performed.

In addition, the present invention provides a display using a memory access apparatus. The memory access apparatus includes a dynamic memory and a memory management unit. The dynamic memory is used to store a plurality of memory data, and the memory management unit is coupled to the dynamic memory. The memory management unit has a plurality of connection ports and each connection port is connected to a corresponding client. The memory management unit stores a priority as a sequence for the clients to access the dynamic memory. When the client accesses the dynamic memory, at least one buffer area is built in the memory management unit, so as to temporarily store a plurality of buffer data generated while the access action is performed.

According to the present invention, buffer areas are built in the memory management unit, such that the data required by a plurality of clients to access the same dynamic memory can be stored in the buffer areas in advance, and then allocated according to the bandwidths and priorities of the clients, thereby achieving the purpose of enabling a plurality of clients to access the same dynamic memory simultaneously, without disposing an exclusive buffer for each client, thereby effectively reducing the circuit area.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
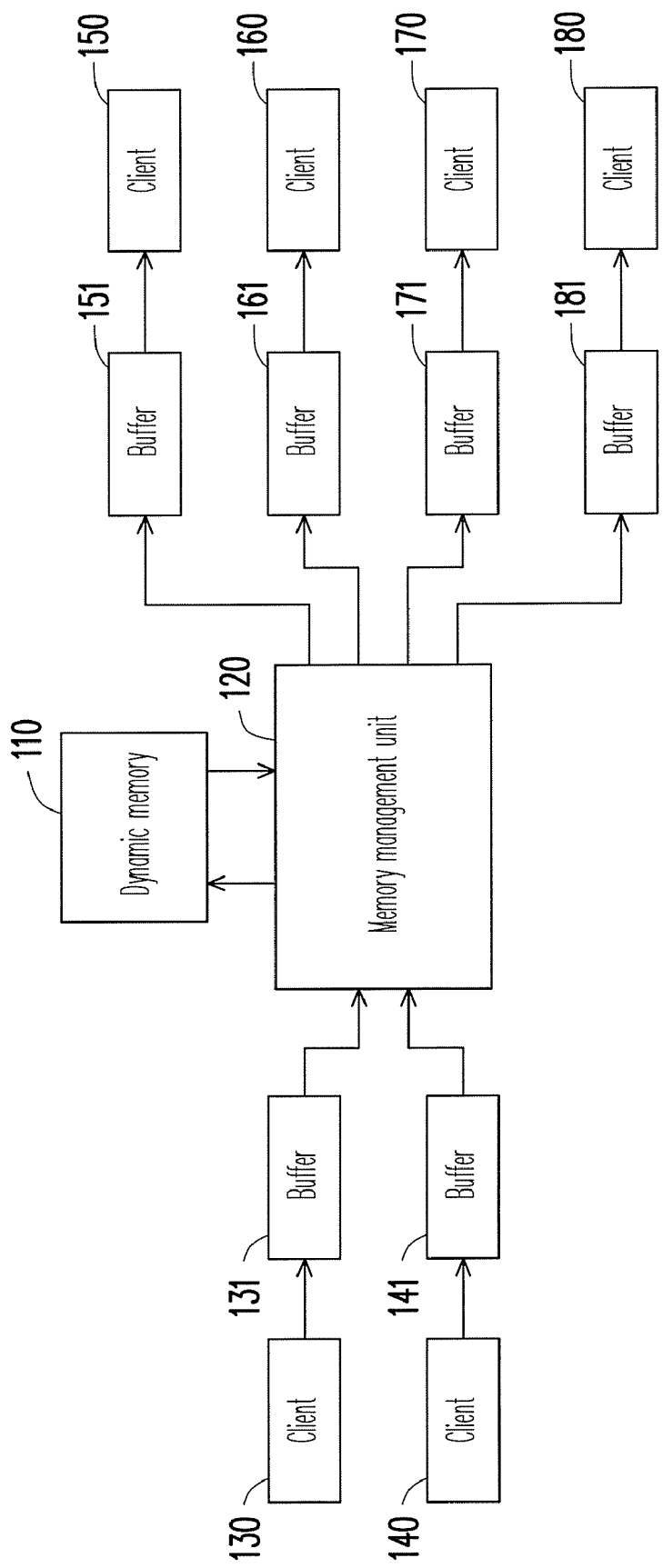
FIG. 1 is a schematic view of a conventional memory access apparatus 100.

Reference will now be made in detail to the present embodiments of the invention, examples of which are illustrated in the accompanying drawings. Wherever possible, the same reference numbers are used in the drawings and the description to refer to the same or like parts.

Figure 2:
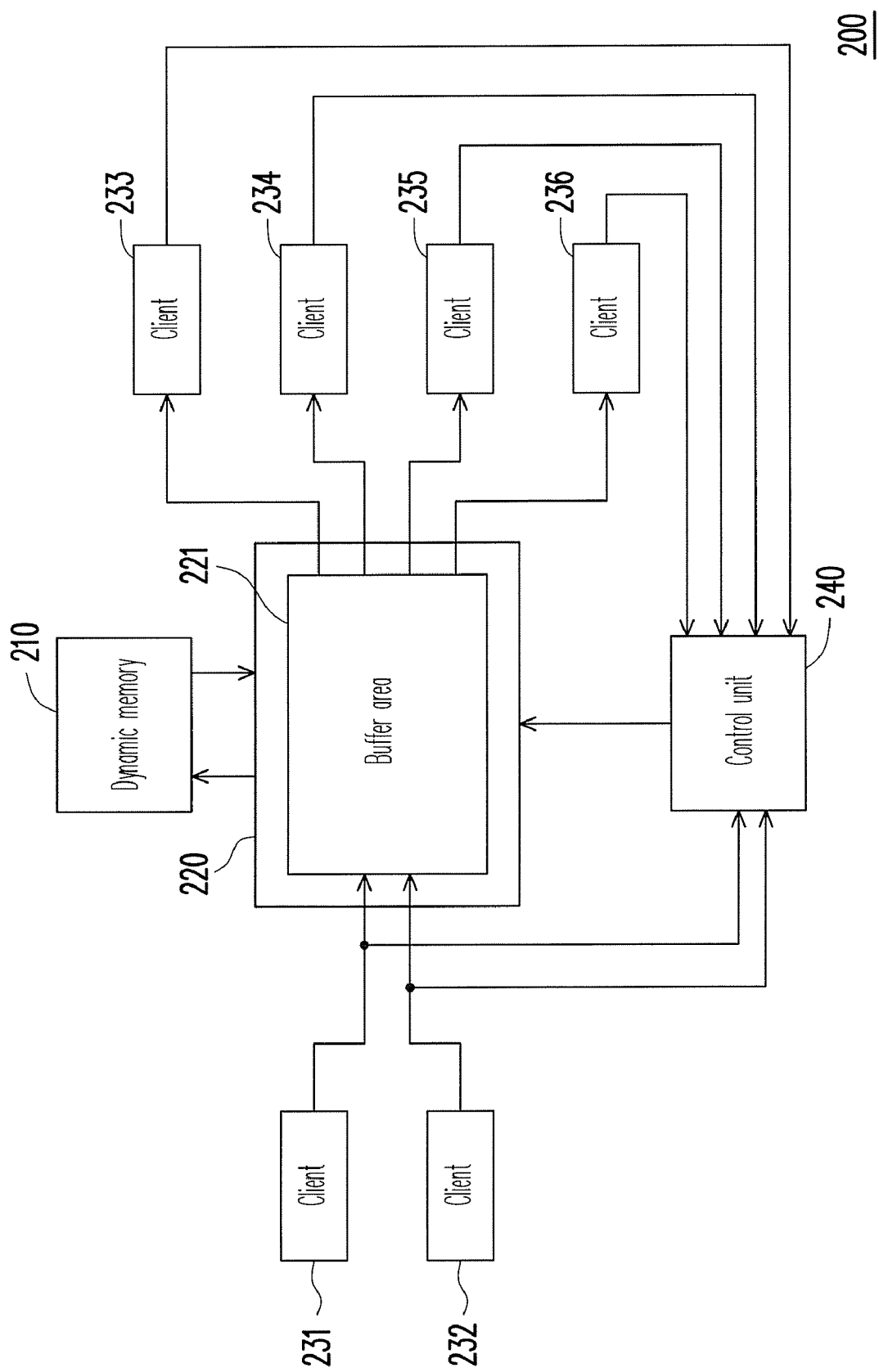
FIG. 2 shows an embodiment of a memory access apparatus of the present invention.

FIG. 2 shows a memory access apparatus according to an embodiment of the present invention. Referring to FIG. 2, the memory access apparatus 200 includes a dynamic memory 210, a memory management unit 220, clients 231-236, and a control unit 240. The dynamic memory 210 is used for the clients 231-236 to store data, and it is the memory management unit 220 that performs actual access actions for the dynamic memory 210.

The memory management unit 220 has a plurality of connection ports, and each connection port is respectively connected to a corresponding client 231-236. The memory management unit 220 further includes a buffer area 221 built therein, and the buffer area 221 is used to store buffer data generated while the clients 231-236 perform reading or writing operation for the dynamic memory 210. Taking the clients 231 and 232 performing a writing action for the dynamic memory 210 as an example, if the dynamic memory 210 is busy when the writing action is performed, the writing action of the clients 231 and 232 cannot be performed immediately. Therefore, the data to be written by the clients 231 and 232 is temporarily stored in the buffer area 221. The memory management unit 220 writes the data temporarily stored in the buffer area 221 to the dynamic memory 210 until the dynamic memory 210 is idle.

Moreover, the memory management unit 220 pre-fetches the data to be read by the clients 233, 234, 235, and 236 from the dynamic memory 210 to the buffer area 221 when the dynamic memory 210 is idle. Once the clients 233, 234, 235, and 236 need to read the data in the dynamic memory 210, they may simply read the data from the buffer area 221.

It should be noted that, the memory management unit 220 arranges to perform the above actions according to a priority stored therein. Herein, the priority is determined according to the importance of the clients 231-236. Definitely, in terms of the priority, the access action required by the client with a higher priority should be performed first. For example, when both the client 231 and the client 232 intend to write data to the dynamic memory 210, the data to be written is then stored in the buffer area 221. Once the memory management unit 220 finds that the dynamic memory 210 is idle, it writes the data of the client 231 with a higher priority (assuming the client 231 has a higher priority than the client 232) temporarily stored in the buffer area 221 to the dynamic memory 210 first, and then writes the data of the client 232 temporarily stored in the buffer area 221 to the dynamic memory 210.

Moreover, the memory management unit 220 may include more than one buffer area. Two or more buffer areas may be partitioned in usage according to the demand of different clients requiring reading and writing actions.

In order to process the data temporarily stored in the buffer area 221 more efficiently and orderly, the buffer area 221 is generally partitioned into a plurality of sub-buffer areas (not shown in FIG. 2) corresponding to the clients 231-236. The control unit 240, coupled to the clients 231-236 and the memory management unit 220, is used to adjust the sizes of the sub-buffer areas. The detailed operations are described herein below.

Figure 3:
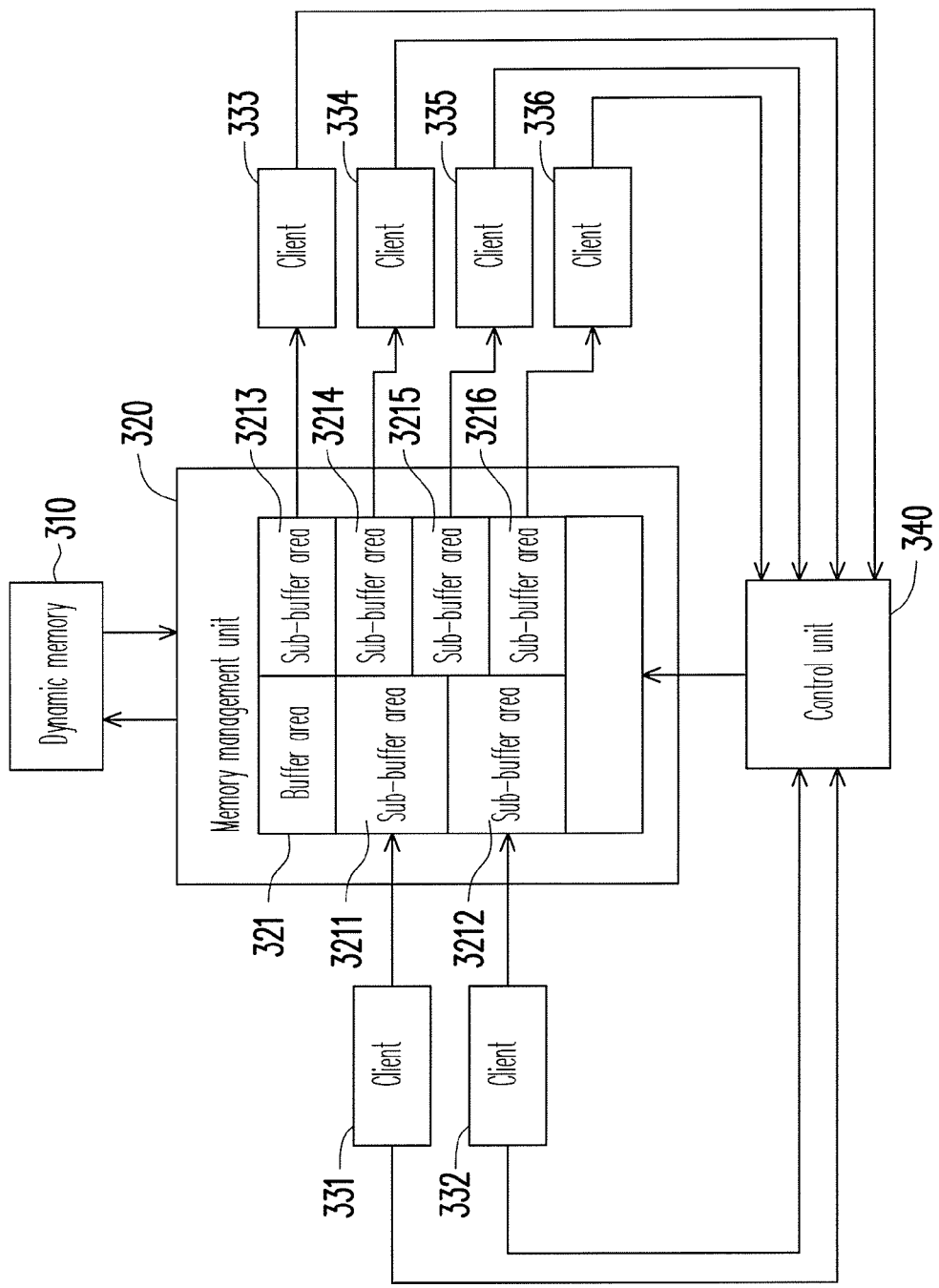
FIG. 3 shows a buffer area configuration according to an embodiment of the present invention.

FIG. 3 shows a buffer area configuration according to an embodiment of the present invention. Referring to FIG. 3, the buffer area 321 is partitioned into six sub-buffer areas 3211, 3212, 3213, 3214, 3215, and 3216 corresponding to the clients 331, 332, 333, 334, 335, and 336. Corresponding to the description about the embodiment in FIG. 2, when the client 331 intends to perform a writing action for the dynamic memory, it temporarily stores the data to be written in the buffer area, that is, temporarily stores the data to be written in the corresponding sub-buffer area 3211 (similarly, when the client 332 intends to perform a writing action for the dynamic memory, it temporarily stores the data to be written in the corresponding sub-buffer area 3212).

The clients 331-336 have different requirements on data in the dynamic memory 310, so that the capacities of the sub-buffer areas 3211-3216 corresponding to the clients should be adjusted dynamically. The control unit 340 is used for dynamically adjusting the capacities of the sub-buffer areas 3211-3216. The control unit 340 determines the size of the sub-buffer area correspondingly required by the client according to the priority of the client and according to the frequency for the client to perform reading and writing actions for the dynamic memory 310.

The memory management unit 320 always processes the data of the client with a higher priority first. Therefore, the sub-buffer area corresponding to the client with a higher priority generally has less data under process stored therein. In other words, the client with a higher priority does not need a large sub-buffer area. In contrast, the client with a lower priority requires a larger sub-buffer area (the priority is inversely proportional to the capacity of the sub-buffer area). In addition, the frequency for the client to perform reading and writing actions for the dynamic memory 310 is also an important factor for determining the size of the sub-buffer area. It is obvious that the client with a higher read/write frequency requires a larger sub-buffer area. Definitely, the client with a lower read/write frequency merely needs a smaller sub-buffer area.

The dynamic adjustment of the buffer area is illustrated through an example below, which aims at demonstrating the dynamic adjustment of the size of the sub-buffer area in detail.

Figure 4:
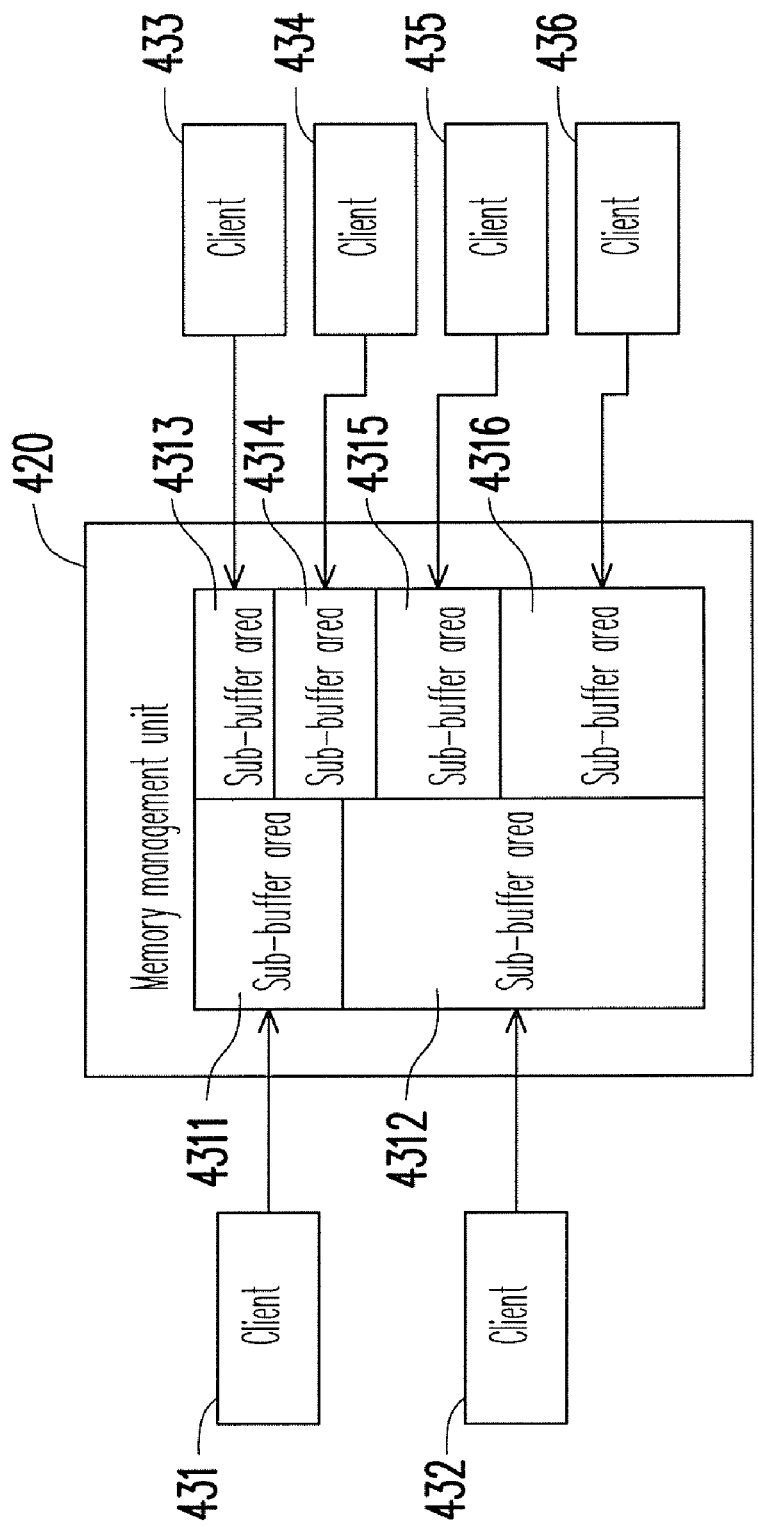
FIG. 4 is a schematic view of adjusting the buffer area.

FIG. 4 is a schematic view of adjusting the buffer area. Referring to FIG. 4, the buffer area of the memory management unit 420 is respectively partitioned into sub-buffer areas 4311, 4312, 4313, 4314, 4315, and 4316 according to the clients 431, 432, 433, 434, 435, and 436. In this embodiment, the priority of the client 431 is higher than that of the client 432, so that the capacity of the sub-buffer area 4311 is smaller than that of the sub-buffer area 4312. In addition, among the clients 433-436, the client 433 has the highest priority, followed by the client 434 and the client 435, and the client 436 has the lowest priority. Thus, among the sub-buffer areas 4313-4316, the sub-buffer area 4316 has the largest capacity, followed by the sub-buffer area 4315 and the sub-buffer area 4314, and the sub-buffer area 4313 has the smallest capacity.

Definitely, the capacities of the sub-buffer areas can also be adjusted according to the frequencies for the clients to access the dynamic memory during the actual operation of the memory access apparatus. The priorities of the clients can also be adjusted during the operation of the memory access apparatus, that is to say, the sub-buffer areas can be adjusted dynamically and flexibly, so as to make full use of the buffer area.

Figure 5:
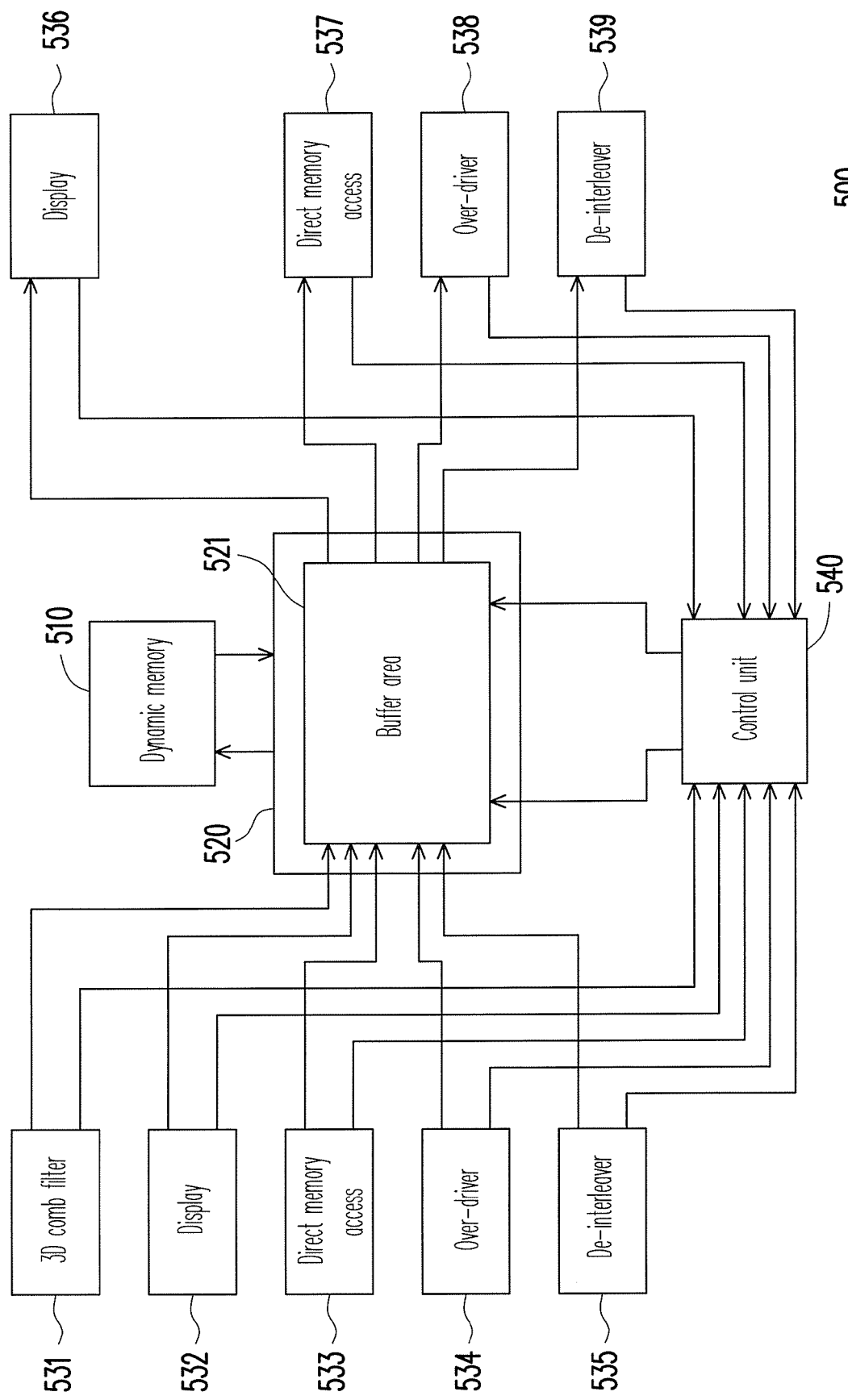
FIG. 5 shows a memory access apparatus used in a display according to an embodiment of the present invention.

FIG. 5 shows a memory access apparatus used in a display according to an embodiment of the present invention. Referring to FIG. 5, the memory access apparatus 500 used in a display includes a dynamic memory 510, a memory management unit 520, a control unit 540, and a plurality of clients. The memory management unit 520 has a buffer area 521. In this embodiment, the clients include a 3D comb filter 531, a display 532, a direct memory access 533, an over-driver 534, and a de-interleaver 535 respectively performing a writing action for the dynamic memory. The clients further include a display 536, a direct memory access 537, an over-driver 538, and a de-interleaver 539 respectively performing a reading action for the dynamic memory (in this embodiment, the same electronic device is considered as two different clients when respectively performing a writing action and a reading action for the dynamic memory, for example, the display 532 and the display 536).

The operations of the memory access apparatus 500 used in a display are similar to that of the above memory access apparatus 200, which can be understood by those ordinarily skilled in the art through derivation, and will not be repeatedly described herein.

In terms of the architecture of the above memory access apparatus used for a display, taking a high definition television (HDTV) as an example, 3 clients are assumed to be existed, in a certain application (for example, two input ends are both the 1080p signal source and the output end is a 1080p panel), the data-accessing frequency required by the 3 clients is 200 million bits/second (Mb/s), and they need to wait for 0.5 seconds to access the dynamic memory. When the memory access apparatus used for a display is operated stably, and the bandwidth of the dynamic memory is assumed to be 750 Mb/s, the sub-buffer area required by each of the 3 clients is 1500 Mb. Therefore, the size of the required buffer area is three times of 1500 Mb, that is, 4500 Mb, and at this time, the utilization efficiency of the dynamic memory is 600/750*100%=80%.

Three independent buffer areas each having a capacity of 1500 Mb are designed in the prior art, when another application occurs (for example, two input ends are both 720p, and the output end is 1440p panel), the data-accessing frequencies required by the 3 clients are 100 Mb/s, 100 Mb/s, and 400 Mb/s respectively. However, under the limit of the hardware (three independent buffer areas each having a capacity of 1500 Mb), the operation can be performed correctly only after the bandwidth of the dynamic memory reaches 794 Mb/s (at this time, each of the 720p clients requires 1228 Mb, and the 1440p client requires 1500 Mb). At this time, the bandwidth utilization of the dynamic memory is reduced to 600/794*100%=75.6%.

Through the present invention, the buffer areas are managed integrally, and the resources are allocated dynamically according to requirements. When being applied to the above example (two input ends are both 720p, and the output end is 1440p panel), the bandwidth utilization of the dynamic memory of 600/750*100%=80% can still be achieved, and at this time, the buffer area required by each 720p client is 1000 Mb, the buffer area required by the 1440p client is 2000 Mb, and they are all together 4000 Mb, which is much less than that of the prior art (two input ends are both 1080p signal sources, and the output end is 1080p panel).

In view of the above, the present invention enables a plurality of clients to access the same dynamic memory through utilizing the buffer area built in the memory management unit, and dynamically adjusts the capacity of each sub-buffer area in the buffer area to improve the utilization performance of the buffer area, thereby more effectively accessing the memory. Moreover, no external buffers corresponding to the clients are required, and the production cost is thus reduced.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A memory access apparatus, comprising:
a dynamic memory, for storing a plurality of memory data; and
a memory management unit, coupled to the dynamic memory, wherein the memory management unit has a plurality of connection ports, and each of the connection ports is directly connected between a corresponding client and at least one buffer area, the connection ports are used for providing the clients to access the buffer directly; the memory management unit stores a priority as a sequence for the clients to access the dynamic memory; and when the clients access the dynamic memory, the buffer area is built in the memory management unit to store temporarily a plurality of buffer data generated while an access action is performed,
wherein the memory management unit partitions the buffer area into a plurality of sub-buffer areas corresponding to the clients, and the capacity of each sub-buffer area is inversely proportional to the priority corresponding to each client.

2. The memory access apparatus according to claim 1, wherein when performing a writing action for the dynamic memory, each of the clients temporarily stores data to be written in the buffer area.

3. The memory access apparatus according to claim 1, wherein when performing a reading action for the dynamic memory, each of the clients reads data that is pre-fetched and stored in the buffer area by the memory management unit.

4. The memory access apparatus according to claim 1, further comprising a control unit, coupled to the clients and the memory management unit, for dynamically adjusting a capacity of each sub-buffer area corresponding to each client according to a frequency for the client to access the dynamic memory and the priority thereof.

5. The memory access apparatus according to claim 1, wherein when performing a writing action for the dynamic memory, each of the clients temporarily stores data to be written in the corresponding sub-buffer area.

6. The memory access apparatus according to claim 1, wherein when performing a reading action for the dynamic memory, each of the clients reads data that is pre-fetched and stored in the sub-buffer area corresponding to the client by the memory management unit.

7. A display, using a memory access apparatus to store display data, wherein the memory access apparatus comprises:
a dynamic memory, for storing a plurality of memory data; and
a memory management unit, coupled to the dynamic memory, wherein the memory management unit has a plurality of connection ports, and each of the connection ports is directly connected between a corresponding client and at least one buffer area, the connection ports are used for providing the clients to access the buffer directly; the memory management unit stores a priority as a sequence for the clients to access the dynamic memory; and when the clients access the dynamic memory, the buffer area is built in the memory management unit to temporarily store a plurality of buffer data generated while the access action is performed,
wherein the memory management unit partitions the buffer area into a plurality of sub-buffer areas corresponding to the clients, and the capacity of each sub-buffer area is inversely proportional to the priority corresponding to each client.

8. The display according to claim 7, wherein when performing a writing action for the dynamic memory, each of the clients temporarily stores data to be written in the buffer area.

9. The display according to claim 7, wherein when performing a reading action for the dynamic memory, each of the clients reads data that is pre-fetched and stored in the buffer area by the memory management unit.

10. The display according to claim 7, further comprising a control unit, for dynamically adjusting a capacity of each sub-buffer area corresponding to each client according to a frequency for the client to access the dynamic memory and the priority thereof.

11. The display according to claim 7, wherein the capacity of each sub-buffer area is inversely proportional to the priority corresponding to each client.

12. The display according to claim 7, wherein when performing a writing action for the dynamic memory, each of the clients temporarily stores data to be written in the corresponding sub-buffer area.

13. The display according to claim 7, wherein when performing a reading action for the dynamic memory, each of the clients reads data that is pre-fetched and stored in the sub-buffer area corresponding to the client by the memory management unit.

14. The display according to claim 7, wherein the clients comprise a display, an image grabber, a direct memory access, a 3-dimensional (3D) comb filter, a de-interleaver, and an over-driver.

* * * * *